US009037861B2

(12) United States Patent
Arya et al.

(10) Patent No.: US 9,037,861 B2
(45) Date of Patent: May 19, 2015

(54) ENHANCING DATA SECURITY USING RE-ENCRYPTION

(71) Applicant: Cellco Partnership, Arlington, VA (US)

(72) Inventors: Siddhartha Kumar Arya, Cumming, GA (US); Brian Libonate, Walnut Creek, CA (US)

(73) Assignee: Cellco Partnership, Basking Ridge, NJ (US)

( * ) Notice: Subject to any disclaimer, the term of this patent is extended or adjusted under 35 U.S.C. 154(b) by 52 days.

(21) Appl. No.: 13/777,125

(22) Filed: Feb. 26, 2013

(65) Prior Publication Data
US 2014/0245012 A1    Aug. 28, 2014

(51) Int. Cl.
*H04L 9/32*      (2006.01)
*H04L 29/06*    (2006.01)

(52) U.S. Cl.
CPC .................................. *H04L 63/0464* (2013.01)

(58) Field of Classification Search
CPC . H04L 63/0428; H04L 63/062; H04L 63/065; H04L 63/0407; H04L 61/30; H04L 63/0838; H04N 21/252; H04N 21/44222; H04N 21/6156; H04N 21/6582; H04N 7/17309; G06F 21/6254; G06F 21/00
USPC ......... 713/171; 380/239, 270; 726/29; 725/9; 709/223
See application file for complete search history.

(56) References Cited

U.S. PATENT DOCUMENTS 8,045,713 B2 * 10/2011 Lain et al. .................... 380/277
2002/0048367 A1 *  4/2002 Maillard ...................... 380/239
2006/0072745 A1 *  4/2006 Fukaya .......................... 380/28

* cited by examiner

*Primary Examiner* — Thanhnga B Truong

(57) ABSTRACT

A data source may be configured to provide usage data including subscriber identifiers and associated information indicative of subscriber device locations and usage. A data warehouse server may be configured to perform operations including: decrypting subscriber identifiers included in usage data received from the data source using a two-way rolling key groups algorithm; re-encrypting the subscriber identifiers decrypted from the usage data to create secure encrypted identifiers using a one-way secured encryption algorithm; and correlating the subscriber identifiers in the decrypted usage data with the corresponding re-encrypted identifiers.

28 Claims, 4 Drawing Sheets

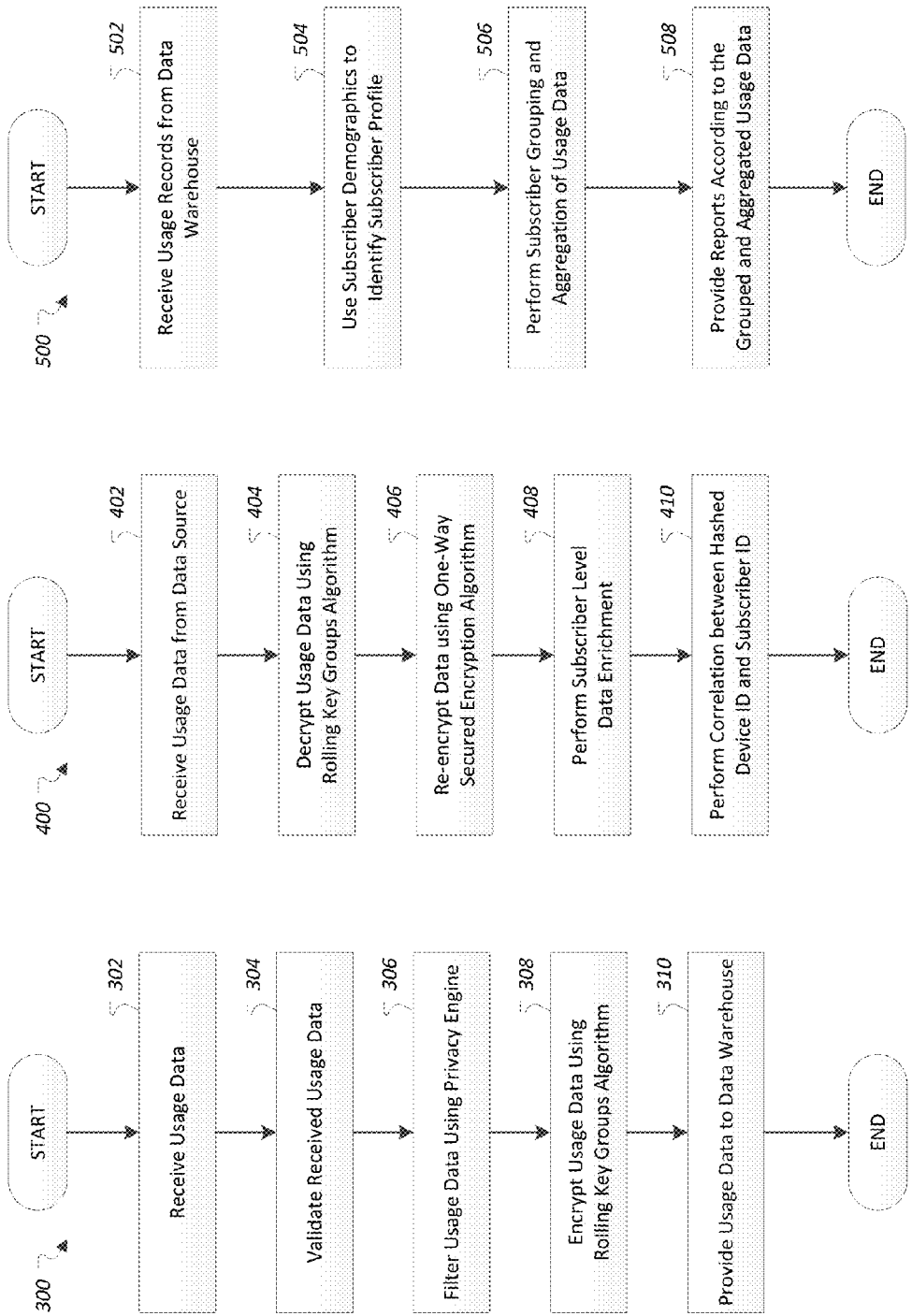

ENHANCING DATA SECURITY USING RE-ENCRYPTION

BACKGROUND

Data security may involve the selective encryption of sensitive data to prevent the data from being accessed or improperly used. In some cases, purveyors of sensitive information may have contractual or legal duties to keep sensitive data safe from unauthorized use. Some encryption methodologies may provide for good data security, but may limit the availability of the encrypted data for certain uses. Other encryption methodologies may be more flexible, but may lack the security necessary for utilization of sensitive personal information.

BRIEF DESCRIPTION OF THE DRAWINGS

FIG. 3 illustrates an exemplary process for processing usage records by the network analysis system.

FIG. 4 illustrates an exemplary process for re-encryption of usage data records.

FIG. 5 illustrates an exemplary process for reporting based on the enriched usage data records.

DETAILED DESCRIPTION

A network analysis system may use encryption techniques designed to safeguard subscriber privacy. For instance, subscriber location data and mobile usage data be encrypted using a rolling key groups methodology before being transmitted to a data warehouse. Up-to-date keys may be provided by a key manager to keep the rolling key groups methodology synchronized. In the data warehouse, data including subscriber identifiers may be securely decrypted and then re-encrypted using a secure one-way encryption methodology, thereby providing encrypted identifiers to hide the subscriber identities.

Because of the security afforded to the subscriber identities based on the one-way encryption methodology, the encrypted identifiers and associated subscriber details may be suitable for use in metrics and marketing campaigns, without risking exposure of sensitive subscriber information outside the system. As an example, to send targeted advertisements to mobile communications devices, an advertiser may select subscribers to receive a targeted advertisement according to data indexed by encrypted subscriber identifier, such that the advertiser may view demographic information about the subscribers and select them to receive the advertisement, without the marketer knowing the true identity of the subscribers being targeted. Thus, a marketing campaign may be implemented to securely target mobile subscribers who pass by a particular location or who are of a certain demographic group.

Figure 1:
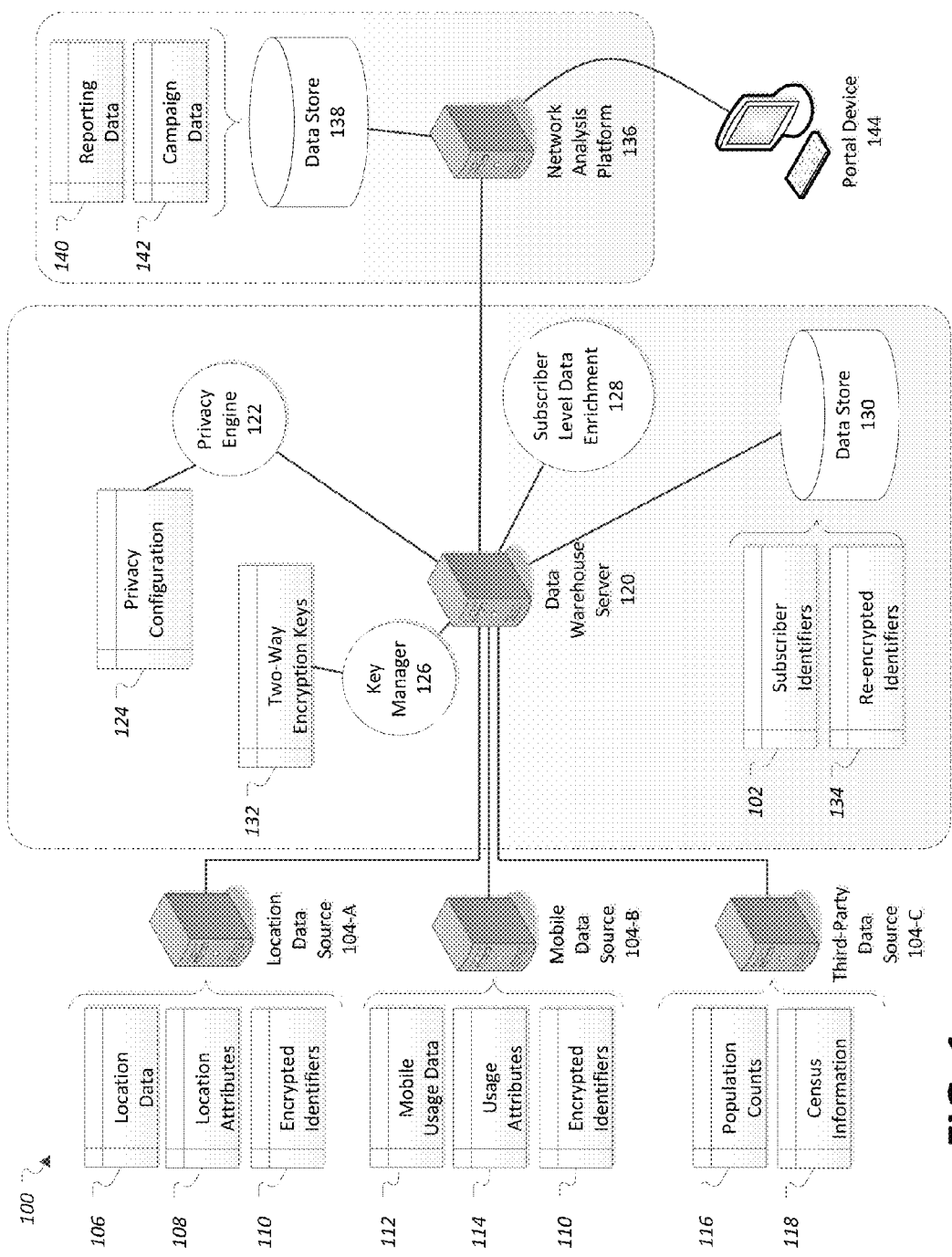
FIG. 1 illustrates an exemplary network analysis system for the secure provisioning of subscriber data to protect subscriber identifiers.

FIG. 1 illustrates an exemplary network analysis system 100 for the secure provisioning of subscriber data to protect subscriber identifiers 102. The system 100 may include a location data source 104-A, a mobile usage source 104-B, and potentially other third-party data sources 104-C. The location data source 104-A may be configured to manage location data 106 and location attributes 108 indexed according to encrypted identifiers 110. The mobile usage source 104-B may be configured to manage mobile usage data 112 indexed according to encrypted identifiers 110. The third-party data sources 104-C may be configured to manage and provide other types of information such as population counts 116 and census information 118. The system 100 may further include a data warehouse server 120 in communication with the location data source 104-A, mobile usage source 104-B and other third-party data sources 104-C, and configured to perform operations in association with a privacy engine 122 and a subscriber-level data enrichment process 128. The system may also include a key manager 126 configured to manage two-way encryption keys 132, and a data store 130 in communications with the data warehouse server 120 and configured to maintain a mapping of subscriber identifiers 102 to re-encrypted identifiers 134. The system 100 may also include a network analysis platform 136 including a network analysis platform 136 in communication with the data warehouse server 120, and configured to maintain reporting data 140 and campaign data 142 in a data store 138, as well as to provide summarizations, aggregations, and reports to a portal device 144. The system 100 may take many different forms and includes multiple and/or alternate components and facilities. While an exemplary system 100 is shown in FIG. 1, the exemplary components illustrated of the system 100 are not intended to be limiting. Indeed, additional or alternative components and/or implementations may be used.

The subscriber identifier 102 may include any of various types of information sufficient to identify the identity of a subscriber or a subscriber device to the system 100. Subscriber identifiers 102 may include mobile device numbers (MDNs), mobile identification numbers (MINs), telephone numbers, common language location identifier (CLLI) codes, Internet protocol (IP) addresses, and universal resource identifiers (URIs), as some non-limiting examples.

The location data source 104-A may be configured to provide functionality for collection of physical location data 106 to the network analysis system 100. The location data source 104-A may be configured to capture location data 106 for various sources, such as network switches or other devices configured to track and record information regarding usage of network services by subscriber communications devices. The captured location data 106 may be representative of voice, text, data access, and hand-off information generated from the user of subscriber devices connected to the communications network, and may include, for example, information indicative of network usage of the subscriber communications devices, or roaming information related to the locations of the subscriber communications devices as they change connection to the network by changing location.

The location data source 104-A may be further configured to associate subscriber device usage with corresponding location data 106, such as roadway segment or geo-fence information related to the location of the underlying call or network use. One exemplary method for determining location data 106 for subscriber communications devices may be to use advanced forward link trilateration (AFLT), whereby a time difference of arrival technique is employed based on responses to signals received from multiple nearby base stations. In some examples, the associated location data 106 may be provided from a listing of network service provider specified road segments or geo-fence boundaries. In cases where the listing of provided network service provider locations changes, historical data can be provided upon identification of new road segments or geo-fence boundaries. Another aspect of the location data source 104-A may be to supply location attributes 108. Location attributes 108 may describe characteristics of locations, types of people who visit or frequent the locations, and types of activities performed or available to be done at the locations.

The location data source 104-A may perform further operations with respect to the location data 106. For example, the location data source 104-A may be configured to determine likely routes that subscriber communications devices may have taken over the network of the service provider based on origination and destination location fixes recorded by the location data source 104-A. As another example, the location data source 104-A may be configured to extrapolate total counts on a given road segment (e.g., by hour, by day) according to the location data 106 recorded from a subset of subscriber communications devices.

To preserve anonymity, subscriber identifiers 102 included in the location data 106 (e.g., customer mobile numbers, origination MIN, dialed digits) may be encrypted by the location data source 104-A into encrypted identifiers 110 using a network service provider defined two-way encryption methodology. A two-way encryption methodology may be utilized to allow for the decryption of the data by recipients of the data from the location data source 104-A.

The location data source 104-A may be configured to provide interfaces to provide the subscriber location data 106 to the system 100. The location data source 104-A may also provide further interfaces as well. These additional interfaces may include, for example, a roadway segment location interface configured to provide roadway location data from the location data source 104-A. Another interface provided by the location data source 104-A may include a point of interest location interface configured to collect actual location fixes (i.e., not extrapolated values) based on the movements of the subscriber communications devices within the network with date/time and error factor of measurement for a given geo fence. Yet another interface provided by the location data source 104-A may include a location attributes 108 interface configured to import the location data 106 and location attributes 108 from a location attribute 108 data store.

The mobile usage source 104-B may be configured to gather mobile Internet data records as part of tracking usage of subscriber communications devices to facilitate billing. In addition to supporting the billing functionalities of the network service provider, the mobile usage source 104-B may be configured to transmit the mobile Internet data records to the data warehouse server 120 for further processing. In some cases, the mobile usage source 104-B may include one or more regional distribution centers, where each may be configured to collect regional mobile usage data 112 and provide the regional mobile usage data 112 to the data warehouse server 120 for its respective network area.

The mobile usage source 104-B may be configured to capture mobile usage data 112 related to mobile internet usage by network service provider subscribers, such as one or more of: websites, e.g., universal resource locators (URLs) being accessed, indications of usage of mobile applications; number of application downloads, and network topology location where the URL was accessed or application was used/downloaded.

The data warehouse server 120 may likewise interface with the mobile usage source 104-B to receive mobile usage data 112. The mobile usage source 104-B may further include additional interfaces to provide other usage information to the data warehouse server 120. These additional interfaces may include, for example, a URL mobile usage data 112 interface configured to provide URL mobile usage data 112, and an application mobile usage data 112 interface configured to provide application mobile usage data 112. In some cases, the application mobile usage data 112 may include application download information. In other cases, however, a second interface may be utilized to provide application download statistics. Yet another interface provided by the location data source 104-A may include a mobile usage attributes 114 interface configured to provide mobile usage attributes 114. The mobile usage attributes 114 may describe characteristics of usage activity for URLs or applications. The mobile usage attributes 114 may also describe types of people who visit the URLs or access the applications according to characteristics of the subscribers associated with the subscriber communications devices.

Similar to as done with the location data source 104-A, to preserve anonymity subscriber identifiers 102 included in the mobile usage data 112 may be encrypted by mobile usage source 104-B into encrypted identifiers 110 using a network service provider defined two-way encryption methodology.

The data warehouse server 120 may be configured to use the interfaces of the location data source 104-A to receive subscriber location data, roadway segment information, point of interest information, and location attributes interface. The data warehouse server 120 may also be configured to use the interfaces of the mobile usage source 104-B to receive mobile usage data 112 and usage attributes 114. The data warehouse server 120 may also be configured to receive information from other systems or third party vendors, such as using a population count interface to extrapolate total audience information by day part for a given road segment or using a census data interface to import census population data into the data warehouse server 120.

In addition, the data warehouse server 120 may be configured to store the location and mobile data records including decrypted subscriber identifiers 102 in the data store 130, and then re-encrypt the subscriber identifiers 102 into re-encrypted identifiers 134 using a one-way mechanism suitable for later use (e.g., by outside third-parties) but relatively impervious to decryption due to its one-way nature.

The privacy engine 122 may be configured to provide information to the data sources 104 to allow the data sources 104 to selectively remove data that should not be analyzed by the system 100. As an example, the privacy engine 122 may be configured to provide a privacy configuration 124 to the data sources 104 to cause them to remove subscribers who had not provided their consent to have their data included in the system 100. As another example, the privacy configuration 124 may include a listing of ineligible subscribers whose data should not be included for various reasons. Subscribers to exclude may be identified in the privacy configuration 124 according to subscriber identifier 102, as an example. As yet a further example, the privacy configuration 124 may include a listing of locations for which data should not be collected. The privacy engine 122 may receive a feed including up-to-date privacy information, which may be provided to the data sources 104 daily, monthly, or as updated, as some examples.

Once filtered and re-encrypted, the data records may then be enriched using a subscriber-level data enrichment process 128. For example, data records such as call data records may be enriched with subscriber billing information and subscriber demographics in the network service provider data warehouse server 120 according to the received data (e.g., received location data 106, received mobile usage data 112, etc.).

The data warehouse server 120 may also perform a correlation between re-encrypted identifiers 134 and subscriber identifier 102 within the data warehouse server 120 to facilitate later mapping back of the one-way re-encrypted identifiers 134 with the corresponding subscriber identifier 102.

The network analysis platform 136 may be configured to receive data from the data warehouse server 120 for further processing. For example, the network analysis platform 136 may store in a data store 138 reporting data 140 including subscriber data without personally identifiable information, subscriber attributes (e.g., location attributes 108 or mobile usage attributes 114 associated with the subscriber) and usage data enriched according to the received location data 106 and received mobile usage data 112. The data store 138 may also be used to store campaign data 142 including subscriber data with personally identifiable information, subscriber attributes (e.g., location attributes 108 or mobile usage attributes 114 associated with the subscriber) and usage data enriched according to the received location data 106 and received mobile usage data 112. Receipt of information from the data warehouse server 120 may enable the network analysis platform 136 to create consumer traffic patterns and to determine which subscribers visited a given audience zone during a specific time period. The data warehouse server 120 may be configured to use the received information to report various metrics useful for network analysis platform 136 products. In some cases data may be made available immediately to the network analysis platform 136, while in other cases data may be delayed by a predetermined period of time (e.g. three days) to ensure further data privacy or to address other concerns.

The portal device 144 may be configured to display reports and other information processed by the network analysis platform 136 and maintained in the data store 138. The portal device 144 may be further configured to receive online transaction information with respect to potential marketing or advertising efforts. For example, the portal device 144 may provide re-encrypted identifiers 134 to an advertiser, each of the re-encrypted identifiers 134 corresponding to one of at least one subscriber and accompanied by additional subscriber information. The portal device 144 may further receive from the advertiser indications of at least a subset of the re-encrypted identifiers 134 to receive a targeted advertisement.

Figure 2A:
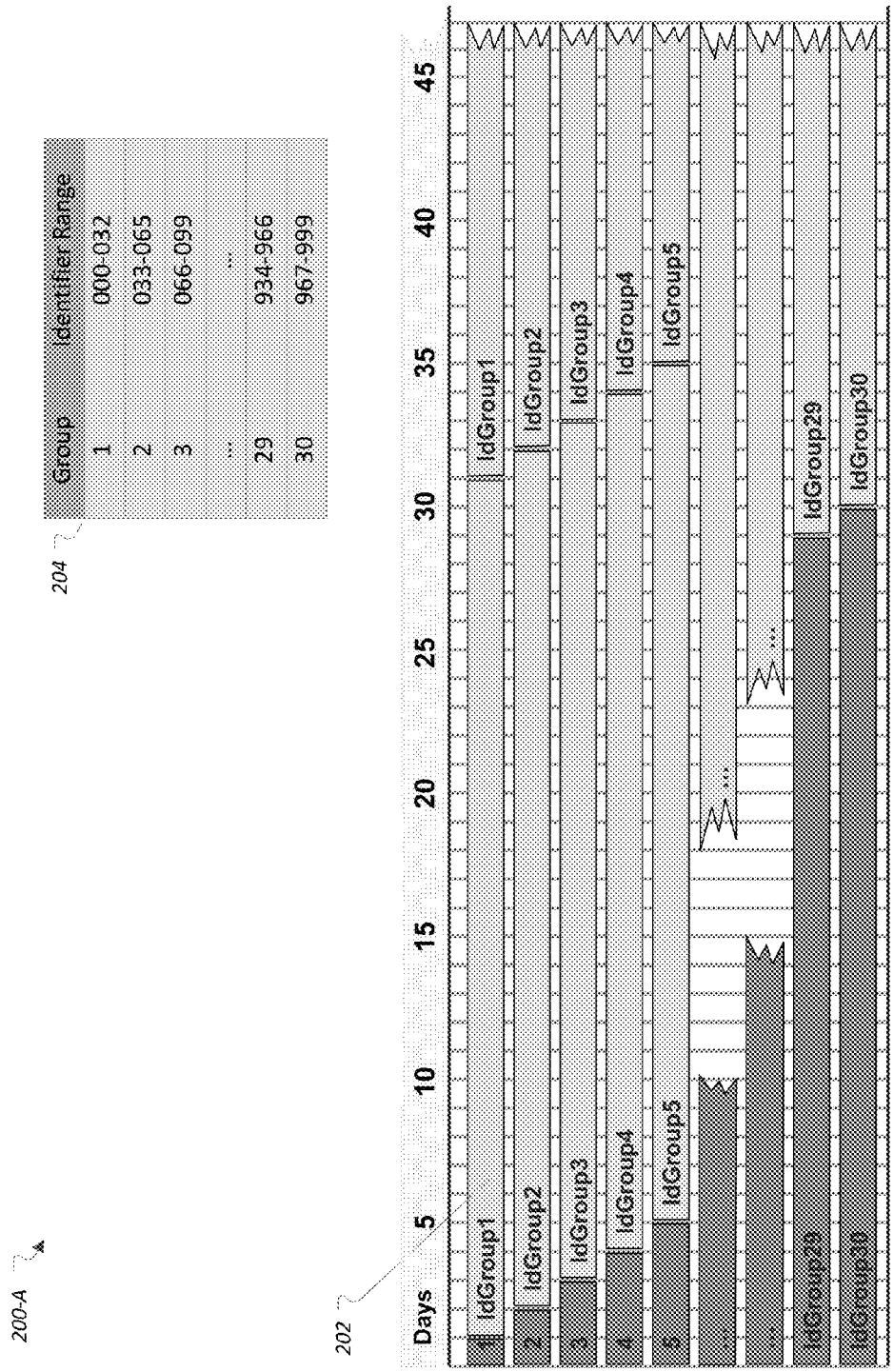
FIG. 2A illustrates an exemplary rolling key groups methodology.

FIG. 2A illustrates an exemplary two-way encryption methodology 200-A including a mapping of two-way encryption keys 132 into rolling key groups 202 according to a group assignment 204. In the mapping, a collection of data may be divided into two or more rolling key groups 202, where for each rolling key group 202 a different two-way encryption key 132 may be used. Each of the rolling key groups 202 may also be set to have a two-way encryption key 132 expiration of a predetermined amount of time, (e.g., a predetermined number of days). Using days as an example, the rolling key groups 202 may then be staggered such that the number of two-way encryption keys 132 and the number of days of key expiration are the same, such that one two-way encryption key 132 is expired and updated each day. The key manager 126 may be used to provide the updated keys. In such a methodology, 1/N of all rolling key groups 202 may receive a new encryption key each day, where N is the number of rolling key groups 202. Such a methodology may be referred to as a rolling key group methodology.

For instance, subscriber communications devices may be assigned to thirty rolling key groups 202 based on the digits of the subscriber identifier (e.g., last three digits of MIN). Then, usage data from subscriber communications devices may be encrypted according to a two-way encryption key 132 determined according to the rolling key group 202 to which the subscriber device is assigned. The group assignment 204 illustrates such an exemplary rolling key group assignment.

Variations on the rolling key group 202 methodology are possible. As an example, rather than each rolling key group 202 receiving a new encryption key every N days, the new encryption keys could be assigned to the rolling key group 202 a random amount of time before a maximum time limit. In other examples, a group of devices having different MTNs may be included in a rolling key group 202 according to other criteria. For instance, multiple devices of the same user or on the same subscriber plan may be assigned to a rolling key group 202 according to an account number shared by the devices or according to an MTN associated with billing for the devices.

By encrypting usage data associated with the subscriber identifier according to corresponding two-way encryption key 132, the data sources 104 may be able to protect the privacy of subscriber communications devices while still allowing for actual subscriber data to be used. For example, location data 106 provided by the location data source 104-A or mobile usage data 112 provided by the mobile data source 104-B may have subscriber identifier 102 information (e.g., MINs) encrypted into encrypted identifiers 110 using the rolling key group 202 methodology. Upon being received by the network analysis platform 136, the encrypted identifiers 110 may be decrypted back into the subscriber identifiers 102. During transit, however, intercepted encrypted identifiers 110 may be difficult to decrypt, due an intermediary not knowing that different two-way encryption keys 132 are being used, let alone the number of different two-way encryption keys 132 and their times of expiration.

To perform a data load, the data warehouse server 120 may be configured to decrypt received data according to the proper two-way encryption key 132. In some examples, the data warehouse server 120 may be able to determine the proper two-way encryption key 132 for an encrypted record by analysis the first predetermined number of bytes of the record. For instance, the data warehouse server 120 may identify the group assignment 204 of the record data according to the first 35 bytes. An exemplary data warehouse server 120 may utilize a multi-threaded process to facilitate the parallel extraction and loading of usage records at substantially the same time.

Figure 2B:
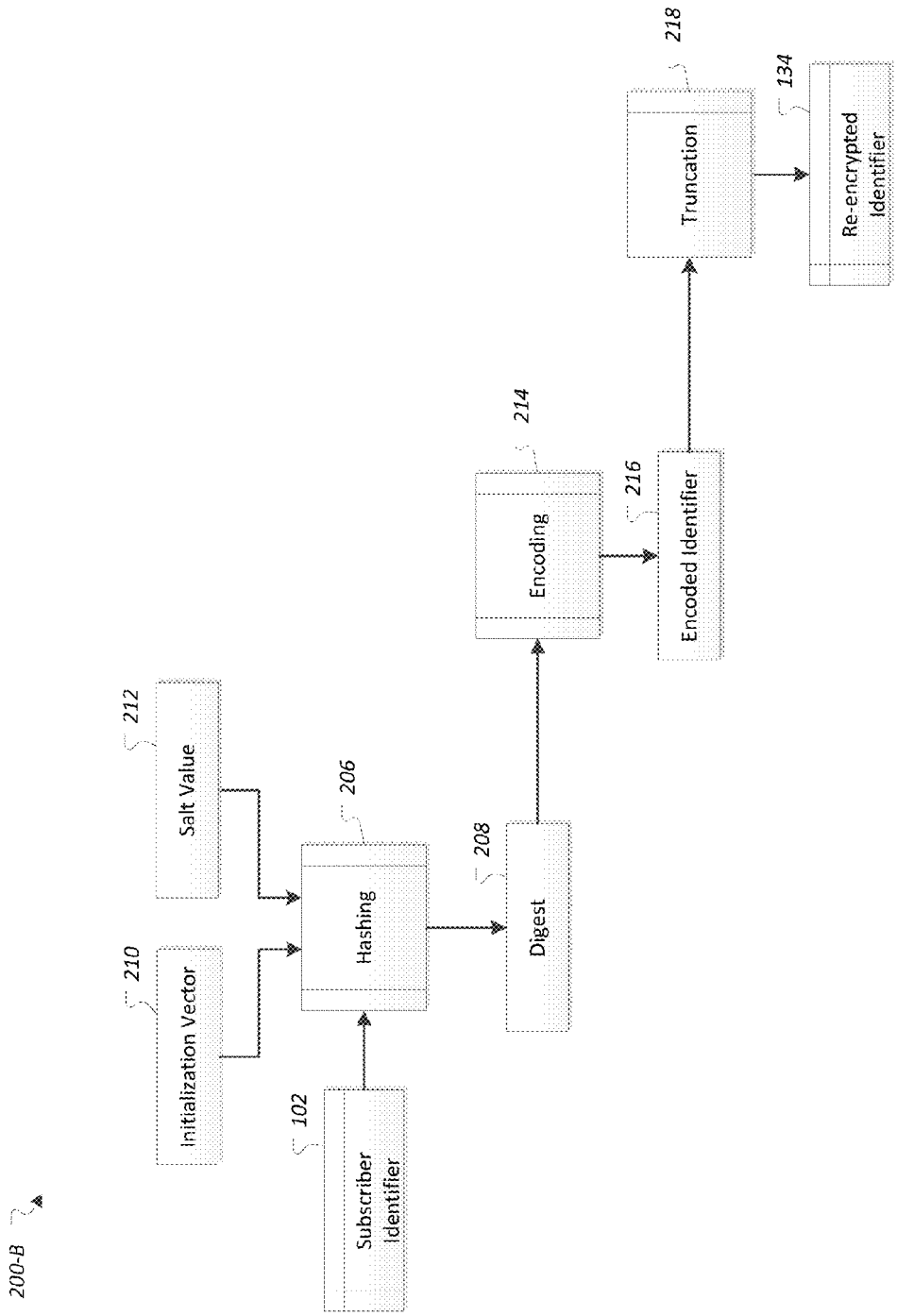
FIG. 2B illustrates an exemplary one-way encryption methodology.

FIG. 2B illustrates an exemplary one-way encryption methodology 200-B providing for processing the decrypted subscriber identifiers 102 into re-encrypted identifiers 134.

The one-way encryption methodology 200-B may perform a hashing 206 using a cryptographic hashing function or procedure designed to obfuscate or otherwise encrypt input data using to mathematical operations. The hashing 206 may be configured to receive a subscriber identifier 102 (e.g., a ten digit MTN) and to provide an encrypted fixed-size bit string digest 208 from which the subscriber identifier 102 may not be readily determined. An exemplary length of digest 208 suitable for use with ten digit MTNs may be 256 bits in length. The hashing 206 may be designed such that a small change in the input string produces a significantly different digest 208. In some cases, to seed the hashing 206, an initialization vector 210 may be utilized for the hashing 206 of the first subscriber identifier 102 or identifiers 102. The initialization vector 210 may be determined, for example, by way of a random number generation. The methodology 200-B may further utilize a salt 212 value (e.g., random data used as an additional input to the hashing 206 algorithm) to further protect the hashed subscriber identifier 102.

The methodology 200-B may further perform an encoding 214 of the digest 208 to translate the binary digest 208 into an encoded identifier 216. The encoded identifier 216 may encode binary digest 208 value into textual or other readable characters that may be more easily stored and transmitted. An exemplary encoding 214 procedure may be the base 64 algorithm used for encoding of e-mail attachments, but other encodings 214 may be utilized. In a base 64 encoding using the exemplary 256-bit identifiers, the encoding 214 would produce a 43 character encoded identifier 216 string representing all 256 bits, where the first 42 bytes of characters each represent six bits of the binary digest 208, and the last character represents the remaining four bits.

Although a 256-bit string may not appear to be large, systems may store terabytes of data records including hashed digests 208. Thus, the storage requirements for the digest 208 may be significant. An algorithm that produces smaller hash values than 256-bit value may save storage, but at the expense of decreased security of the encrypted subscriber identifiers 102. To allow smaller resultant re-encrypted identifiers 134 without affecting security, the methodology 200-B may perform a truncation 218 of a more lengthy encoded identifier 216 (e.g., the exemplary 256-bit identifier) to produce the re-encrypted identifier 134. Since the re-encrypted identifier 134 does not contain the entire encrypted value, it would be extremely difficult for a re-encrypted identifier 134 to be reversed back into the original subscriber identifier 102. Thus, security of the subscriber identifiers 102 would not be compromised, and in fact may be enhanced.

Rather than decreasing security, however, a potential concern for use of truncation 218 on the re-encrypted identifiers 134 is collisions, where a re-encrypted identifier 134 may ambiguously be computed from more than one subscriber identifier 102. Nevertheless, this collision risk may be mitigated by including enough bits of the encoded identifier 216 in the truncated re-encrypted identifiers 134 to make such a collision highly unlikely. As an example, utilizing the first 90 bits of a 256-bit encoded identifier 216 may provide for good security while at the same time avoiding the likelihood of subscriber identifier 102 collisions in the re-encrypted identifiers 134.

FIG. 3 illustrates an exemplary process 300 for processing usage records by the network analysis system 100. The process 300 may be performed by various devices, such as by a data source 104 providing data to a data warehouse server 120.

In block 302, the data source 104 receives usage data. For instance, a location data source 104-A may receive location data 106 and location attribute 108 with respect to subscriber devices of the system 100. The location data source 104-A may receive captured voice, text, data access, and hand-offs generated from a subscriber communications device and associated corresponding locations (e.g., roadway segment, geo-fence) information; likely routes subscriber communications devices took based on origin/destination location fixes; and extrapolated total counts on a given road segment by time period. As another example, a mobile usage source 104-B may receive mobile usage data 112 or usage attributes 114 with respect to the URL, network or application usage of subscriber devices.

In block 304, the data source 104 validates the received usage data. For example, to ensure that the received files are correct and suitable for use, the data source 104 may perform data checks such as a file size check or a total row count received vs. total row count check analysis. As another example, to ensure that the received file are in a proper format and have not been corrupted, a field format check, a file format check, a verification of presence of required fields, or a record length check may be performed. If an error is determined, rather than manually correcting the data, reprocessing of erroneous data may be accomplished by performing a fresh file extraction such as discussed with respect to block 302 above. In some examples, erroneous location records should be reprocessed within a short timeframe (e.g., within the same week) in order to maintain historical information for aggregation and reporting.

In block 306, the data source 104 filters the usage data using a privacy configuration 124 received from a privacy engine 122. For example, the data source 104 may be configured to request the privacy engine 122 to provide a privacy configuration 124 including information that may be used to allow the data source 104 to filter usage data, such as location data 106 and mobile usage data 112, to remove data that should not be analyzed by the system 100. As another example, the privacy configuration 124 may include a listing of subscribers who have not provided consent or who are otherwise ineligible to have their data included in the system 100.

In block 308, the data source 104 encrypts the received usage data. The received usage data may be encrypted according to a two-way encryption methodology, such as the rolling key groups methodology using two-way encryption keys 132 discussed in detail above with respect to FIG. 2. For instance, the usage server may query a key manager 126 for up-to-date set of two-way encryption keys 132 to use to perform the encryption.

In block 310, the data source 104 provides the encrypted data to the data warehouse server 120. For example, the data source 104 may provide the data to the data warehouse server 120 using a secured virtual private network connection. After block 310, the process 300 ends.

FIG. 4 illustrates an exemplary process 400 for re-encryption of usage data records. The process 400 may be performed by various devices, such as by a data warehouse server 120.

In block 402, the data warehouse server 120 receives usage data from a data source 104. For example, the data warehouse server 120 may receive data from one or more data sources 104 over a secured virtual private network connection.

In block 404, the data warehouse server 120 decrypts the received usage data. The received usage data may be decrypted according to a two-way encryption methodology, such as the rolling key groups methodology using two-way encryption keys 132 discussed in detail above with respect to FIG. 2.

In block 406, the data warehouse server 120 re-encrypts the decrypted usage using a one-way secured encryption methodology 200-B. As discussed above with respect to FIG. 2B, the re-encryption may include, for example, performing a cryptographic hashing 206 on subscriber identifiers 102 in the decrypted usage data to generate a message digest 208, using a salt value 212 for further security. The re-encryption may further include encoding 214 the digest 208 into a textual format encoded identifier 216 (e.g., a base 64 representation) for easier storage and transmission, and performing a truncation 218 to provide only a leading portion of the base 64 representation as an output re-encrypted identifier 134 to maintain security and prevent decryption. As mentioned above, the one-way encryption methodology 200-B provides for enhanced security of the subscriber identifiers 102 by producing a long digest 208 and making use of a salt value 212, while at the same time provided good space efficiency using the encoding 214 and truncation 218 and mitigating the potential for identifier collisions.

In block 408, the data warehouse server 120 enriches the usage data associated with the subscribers. The subscriber usage data may be enriched according to the various received sources of information to provide a more full view of the aspects of the subscriber. For example, the subscriber usage data may be enriched with information relating to subscriber billing, subscriber demographics, locations frequented by the subscriber, and URLs or applications used by the subscriber. The subscriber usage data may also be enriched by other aspects related to the information, such as, based on the locations that the subscriber frequents, associating the subscriber with characteristics of other subscribers who also frequent those locations or with types of activities that may be performed at those locations.

In block 410, the data warehouse server 120 performs a correlation between re-encrypted identifier 134 and subscriber identifier 102. For example, the data warehouse server 120 may perform a correlation between re-encrypted identifier 134 and subscriber identifier 102 within the data warehouse server 120 to facilitate later mapping back of the one-way encrypted device identifier with the corresponding subscriber identifier 102. After block 410, the process 400 ends.

FIG. 5 illustrates an exemplary process 500 for reporting based on the enriched usage data records. The process 500 may be performed by various devices, such as by a network analysis platform 136 in communication with a data warehouse server 120.

In block 502, the network analysis platform 136 receives enriched usage data from the data warehouse server 120. For example, the network analysis platform 136 may receive the enriched usage data discussed above with respect to the process 400. To preserve anonymity, in some cases the network analysis platform 136 may not be provided with the correlation between re-encrypted identifier 134 and associated subscriber identifier 102. Because of the security afforded to the subscriber identities based on the one-way encryption methodology, the encrypted identifiers and associated subscriber details may be suitable for use in metrics and marketing campaigns, without risking exposure of the privacy of the individual subscribers to the system 100.

In block 504, the network analysis platform 136 uses subscriber demographics to identify subscriber profiles. Subscriber demographics may be used to identify a marketing profile to which the subscriber belongs. For example, the subscriber may be associated with a marketing segment based on the demographics of the subscriber. An exemplary set of marketing segments that may be used is the segment definitions provided by the Acxiom Corporation of Little Rock, Ark. In other examples, the network service provider or other party may define the segments to which subscribers may be assigned.

In block 506, the network analysis platform 136 performs subscriber groupings and aggregation of usage data. The aggregation of subscribers may be determined based in part on the identified subscriber profiles or segments, such that data may be aggregated for subscribers within the same segment or profile. As an example, subscribers may be aggregated according to one or more demographic characteristics with which the usage data was enriched, such as age, sex, ethnicity, residence location (e.g, zip code), income level, and occupation. As another example, subscribers may be aggregated according to past mobile data usage activity, such as frequenting particular locations (e.g., points of interest) or types of locations (e.g., coffee houses), or according to spending patterns or web browsing characteristics (e.g., history of click-through actions on advertisements for particular goods or types of goods, purchase history from application store associated with the subscriber device). The rules for segmentation of subscribers may vary according to implementation as well as according to marketing campaign or other desired purpose.

In block 508, the network analysis platform 136 provides reports according to the groups and aggregated usage data. These reports may be provided to the portal device 144. For example, the network analysis platform 136 may utilize the received location data 106 to create subscriber traffic pattern reports and to create reports indicative of how many subscribers with what characteristics visited a given audience zone (e.g., a point of interest such as a city landmark) during a specific time period. For instance, a report may be indicative of how many subscribers within the ages of 18-25 visited the CNN Center in Atlanta, Ga. between the hours of 4:00-6:00 PM on weekdays. As another example, a report may be indicative of the number of subscribers commuting past a particular location per day. Using the location attributes 108, the network analysis platform 136 may further provide reporting information describing the characteristics of the locations at which the subscribers were located. As another example, using the usage attributes 114, the network analysis platform 136 may provide reporting information describing the characteristics of the usage activity for URLs or applications, or descriptive of the types of people who visiting URLs or who access certain applications. As some other examples, reporting may be performed according to the usage data to calculate total audience counts visiting a mobile site, total counts viewing an ad campaign or total counts using a mobile application. The network analysis platform 136 may further link the mobile usage data 112 with audience demographic information reported to the data warehouse server 120, such as via the third-party data source 104-C. After block 508, the process 500 ends.

By use of the system 100, an advertiser may be able to provide advertisements to subscribers with certain demographic characteristics that are within a certain geographic areas. Rather than allowing the advertisers to have sensitive subscriber identifiers 102, the system 100 may instead decrypt received usage data including encrypted identifiers 110, and may use a secure one-way encryption methodology to encrypt the subscriber identifiers 102 into re-encrypted identifiers 134. The system 100 may then provide the re-encrypted identifiers 134 and other demographic or other information to the advertisers, thereby allowing the advertisers to choose which subscribers may receive an advertisement, without ever knowing personally-identifiable information about the subscribers being targeted.

In general, computing systems and/or devices, such as the data warehouse server 120 and network analysis platform 136, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance.

Computing devices such as the data warehouse server 120 and network analysis platform 136 generally include computer-executable instructions, where the instructions may be executable by one or more processors. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computing device). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores, such as the data stores 130 and 138 described herein, may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. In some example, the computer program product may be provided as software that when executed by one or more processors provides the operations described herein. Alternatively, the computer program product may be provided as hardware or firmware, or combinations of software, hardware and/or firmware.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system, comprising:
   a data source configured to provide usage data including subscriber identifiers and associated information indicative of subscriber device locations and usage; and
   a data warehouse server configured to perform operations comprising:
   decrypting subscriber identifiers included in usage data received from the data source using a two-way rolling key groups methodology;
   re-encrypting the subscriber identifiers decrypted from the usage data to create secure encrypted identifiers using a one-way secured encryption algorithm;
   correlating the subscriber identifiers in the decrypted usage data with the corresponding re-encrypted identifiers;
   at least one of:
   a) providing the re-encrypted identifiers to an advertiser, each re-encrypted identifier corresponding to a respective subscriber and accompanied by the associated information; and receiving from the advertiser indications of at least a subset of the re-encrypted identifiers to receive a targeted advertisement based on the associated information; and
   b) performing the one-way secured encryption algorithm by performing a hash of the subscriber identifiers into digests with a salt value, encoding the digests into text strings; and applying a truncation to the text strings to create the re-encrypted identifiers, thereby protecting the integrity of the subscriber identifiers.

2. The system of claim 1, further comprising a key manager configured to receive a query from the data source requesting updated rolling key information; and providing the updated rolling key information responsive to the request.

3. The system of claim 2, wherein the key manager is further configured to determine a group assignment to be used in the two-way rolling key groups methodology by assigning ranges of subscriber identifiers into key groups, such that each key group is associated with a different two-way encryption key, and usage data associated with a subscriber identifier in the range of subscriber identifiers is encrypted using the respective associated two-way encryption key.

4. The system of claim 1, wherein the data warehouse server is further configured to perform operations comprising:
providing the re-encrypted identifiers to an advertiser, each re-encrypted identifier corresponding to a respective subscriber and accompanied by the associated information; and
receiving from the advertiser indications of at least a subset of the re-encrypted identifiers to receive a targeted advertisement based on the associated information.

5. The system of claim 1, wherein the data source is further configured to filter the usage data according to a privacy configuration to remove usage data associated with at least one of: non-consenting subscribers, ineligible subscribers and restricted locations.

6. The system of claim 1, wherein the data warehouse server is further configured to determine a key group of the rolling key groups to use to decrypt a usage record based on a predetermined initial number of bytes of the usage record to be decrypted.

7. The system of claim 1, wherein the two-way rolling key groups algorithm includes N keys groups, each of the N key groups being staggered such that each of the N key groups is used for N time periods, and one of the N key groups expires per time period.

8. The system of claim 1, wherein the data warehouse server is further configured to perform the one-way secured encryption algorithm by performing a hash of the subscriber identifiers into digests with a salt value, encoding the digests into text strings, and further applying a truncation to the text strings to create the re-encrypted identifiers, thereby protecting the integrity of the subscriber identifiers.

9. The system of claim 8, wherein the subscriber identifiers are mobile telephone numbers, the digests are 256 bits in length, and wherein the truncation creates the re-encrypted identifiers using the first 90 bytes of the encrypted identifiers.

10. A method, comprising:
decrypting usage data, by a data warehouse server, using a two-way rolling key groups algorithm, the usage data including subscriber identifiers and associated information indicative of subscriber device locations and usage;
re-encrypting, by the data warehouse server, the subscriber identifiers decrypted from the usage data to create secure encrypted identifiers using a one-way secured encryption algorithm; and
correlating, by the data warehouse server, the subscriber identifiers in the decrypted usage data with the corresponding re-encrypted identifiers
at least one of:
a) providing the re-encrypted identifiers to an advertiser, each re-encrypted identifier corresponding to a respective subscriber and accompanied by the associated information; and receiving from the advertiser indications of at least a subset of the re-encrypted identifiers to receive a targeted advertisement based on the associated information; and
b) performing the one-way secured encryption algorithm by performing a hash of the subscriber identifiers into digests with a salt value, encoding the digests into text strings; and applying truncation to the text strings to create the re-encrypted identifiers, thereby protecting the integrity of the subscriber identifiers.

11. The method of claim 10, further comprising:
providing the re-encrypted identifiers to an advertiser, each re-encrypted identifier corresponding to a respective subscriber and accompanied by the associated information; and
receiving from the advertiser indications of at least a subset of the re-encrypted identifiers to receive a targeted advertisement based on the associated information.

12. The method of claim 10, further comprising:
determining a key expiration according to the two-way rolling key groups methodology;
querying a key manager for updated rolling key information based on the key expiration; and
receiving the updated rolling key information responsive to the request.

13. The method of claim 10, further comprising further comprising assigning keys groups to be used in the rolling key groups algorithm according to ranges of subscriber identifiers.

14. The method of claim 10, further comprising filtering the usage data according to a privacy configuration to remove usage data associated with at least one of: non-consenting subscribers, ineligible subscribers and restricted locations.

15. The method of claim 10, further comprising determining a key group of the rolling key groups to use to decrypt a usage record based on a predetermined initial number of bytes of the usage record to be decrypted.

16. The method of claim 10, wherein the two-way rolling key groups algorithm includes N keys groups, each of the N key groups being staggered such that each of the N key groups is used for N time periods, and one of the N key groups expires per time period.

17. The method of claim 10, further comprising performing the one-way secured encryption algorithm by performing a hash of the subscriber identifiers into digests with a salt value, encoding the digests into text strings, and further applying truncation to the text strings to create the re-encrypted identifiers, thereby protecting the integrity of the subscriber identifiers.

18. A non-transitory computer readable medium storing computer-executable instructions executable by a computing device to provide operations comprising:
decrypting usage data using a two-way rolling key groups algorithm, the usage data including subscriber identifiers and associated information indicative of subscriber device locations and usage;
re-encrypting the subscriber identifiers decrypted from the usage data to create secure encrypted identifiers using a one-way secured encryption algorithm; and
correlating the subscriber identifiers in the decrypted usage data with the corresponding re-encrypted identifiers;
at least one of:
a) providing the re-encrypted identifiers to an advertiser, each re-encrypted identifier corresponding to a respective subscriber and accompanied by the associated information; and receiving from the advertiser indications of at least a subset of the re-encrypted identifiers to receive a targeted advertisement based on the associated information; and b) performing the one-way secured encryption algorithm by performing a hash of the subscriber identifiers into digests with a salt value, encoding the digests into text strings, and further applying a truncation, thereby protecting the integrity of the subscriber identifiers.

19. The non-transitory computer readable medium of claim 18, further providing for operations comprising:

providing the re-encrypted identifiers to an advertiser, each re-encrypted identifier corresponding to a respective subscriber and accompanied by the associated information; and receiving from the advertiser indications of at least a subset of the re-encrypted identifiers to receive a targeted advertisement based on the associated information.

20. The non-transitory computer readable medium of claim 18, further providing for operations comprising assigning keys groups to be used in the rolling key groups algorithm according to ranges of subscriber identifiers.

21. The non-transitory computer readable medium of claim 18, further providing for operations comprising determining a key group of the rolling key groups to use to decrypt a usage record based on a predetermined initial number of bytes of the usage record to be decrypted.

22. The non-transitory computer readable medium of claim 18, wherein the two-way rolling key groups algorithm includes N keys groups, each of the N key groups being staggered such that each of the N key groups is used for N time periods, and one of the N key groups expires per time period.

23. The non-transitory computer readable medium of claim 18, further providing for operations comprising performing the one-way secured encryption algorithm by performing a hash of the subscriber identifiers into digests with a salt value, encoding the digests into text strings, and further applying a truncation, thereby protecting the integrity of the subscriber identifiers.

24. A non-transitory computer readable medium storing computer-executable instructions executable by a computing device to provide operations comprising:

maintaining a group assignment indicating ranges of subscriber identifiers and associated rolling key groups, each range of subscriber identifiers being associated with a different rolling key group;

identifying a rolling key group to which a particular subscriber identifier is assigned by determining which of the ranges of subscriber identifiers includes the particular subscriber identifier;

encrypting user data associated with the particular subscriber identifier into an encrypted record according to a two-way encryption key associated with the identified rolling key group;

including in the encrypted record an indication of the identified rolling key group to facilitate decrypting the encrypted user data;

decrypting usage data, by a data warehouse server, using a two-way rolling key groups algorithm, the usage data including subscriber identifiers and associated information indicative of subscriber device locations and usage;

re-encrypting, by the data warehouse server, the subscriber identifiers decrypted from the usage data to create secure encrypted identifiers using the one-way secured encryption algorithm;

correlating, by the data warehouse server, the subscriber identifiers in the decrypted usage data with the corresponding re-encrypted identifiers;

at least one of:

a) providing the re-encrypted identifiers to an advertiser, each re-encrypted identifier corresponding to a respective subscriber and accompanied by the associated information; and receiving from the advertiser indications of at least a subset of the re-encrypted identifiers to receive a targeted advertisement based on the associated information; and b) performing the one-way secured encryption algorithm by performing a hash of the subscriber identifiers into digests with a salt value, encoding the digests into text strings; and applying truncation to the text strings to create the re-encrypted identifiers, thereby protecting the integrity of the subscriber identifiers.

25. The non-transitory computer readable medium of claim 24, further providing for operations comprising maintaining N keys groups in the group assignment, each of the N key groups being staggered such that each of the N key groups is used for N different time periods, and a subset of the N key groups expires per a specific time period.

26. The non-transitory computer readable medium of claim 24, further providing for operations comprising including an equal number of subscriber identifiers in each of the ranges of subscriber identifiers of the group assignment.

27. The non-transitory computer readable medium of claim 24, wherein the subscriber identifiers are telephone numbers, and further providing for operations comprising using a device number of a subscriber device with which the user data is associated as the subscriber identifier.

28. The non-transitory computer readable medium of claim 24, further providing for operations comprising determining a particular key group of the rolling key groups to use to decrypt the encrypted record based on the indication of the identified rolling key group included in the encrypted record.

* * * * *